United States Patent Office 3,793,390
Patented Feb. 19, 1974

3,793,390
METHOD FOR PRODUCING ISOPRENE
Kazumi Takagi, Teruo Matsuda, and Masahiro Murakami, Niihama, Japan, assignors to Sumitomo Chemical Company, Limited, Osaka-fu, Japan
No Drawing. Filed Jan. 20, 1971, Ser. No. 108,197
Claims priority, application Japan, Jan. 20, 1970, 45/5,571
Int. Cl. C07c 1/24, 11/18
U.S. Cl. 260—681                                       6 Claims

ABSTRACT OF THE DISCLOSURE

A method for producing isoprene which comprises reacting isobutene and 4,4-dimethyl-1,3-dioxane in a liquid phase in the presence of a catalyst at a temperature from 110° to 180° C. to give isoprene in an excellent yield.

The present invention relates to a method for producing isoprene. More particularly, it relates to a method for production of isoprene from isobutene and 4,4-dimethyl-1,3-dioxane by the liquid phase reaction at a relatively high temperature.

For the production of isoprene from 4,4-dimethyl-1,3-dioxane (hereinafter referred to as "DMD"), there has been known a method using a thermal decomposition reaction of DMD, i.e. the so-called "IFP method" [cf. Kirk-Othmer's Encyclopedia of Chemical Technology, 2nd ed., vol. 12, p. 76]. According to the thermal decomposition reaction method of DMD, it is stoichiometrically impossible to obtain more than 1 mole of isoprene from 1 mole of DMD, and formaldehyde is necessarily produced in the same molar amount or less as that of the starting DMD. As the thermal decomposition reaction is performed at a high temperature in a gas phase, formaldehyde thus produced is readily decomposed under the said reaction conditions, and various side reactions take place to result in the decreased yield of isoprene and the decomposition products of formaldehyde are deposited on the surface of the catalyst to cause remarkably the depression of the catalytic activity. In order to avoid such drawback, there has been proposed a method for producing isoprene by adding t-butanol to easily decomposable formaldehyde produced in the thermal decomposition reaction system. However, according to this method, it is difficult to convert said formaldehyde to isoprene in a high yield.

In the course of the extensive studies on the thermal decomposition reaction of DMD, it has been recognized that, in case of the reaction being effected in a gas phase, it is generally necessary to decompose DMD at a temperature from 300° to 400° C., and, as above mentioned, formaldehyde thus produced is readily decomposed under the said reaction conditions. It has also been found that, in case of the reaction being carried out at a temperature from 110° to 180° C. in an aqueous solution, formaldehyde thus produced is more stable and the formaldehyde is reacted immediately with isobutene in the decomposition reaction system of DMD to produce DMD. Further, it has been found that isoprene can be obtained from DMD and isobutene in excellent yields by repeating the above reaction. The present invention is based on these findings.

According to the present invention, there is provided a method for producing isoprene which comprises reacting isobutene and 4,4-dimethyl-1,3-dioxane in a liquid phase in the presence of a catalyst at a temperature from 110° to 180° C.

As the catalyst, there may be used a variety of substances which are acidic under the reaction conditions. Examples of such substances are as follows: inorganic acidic substances (e.g. HCl, HBr, $H_2SO_4$, $H_2SO_3$, $H_3PO_4$, $H_3BO_3$, $HBO_2$, $ClSO_3H$, phosphorotungstic acid, borotungstic acid, $AlCl_3$, $FeCl_2$, $FeCl_3$, $HgCl_2$, $ZnCl_2$, $PdCl_2$, $CrPO_4$, $Cr_2(SO_4)_3$, $MnCl_2$, $CdCl_2$, $LiCl$, $FeSO_4$, $CrCl_3$, $NiCl_3$, $CoCl_2$, $CuCl_2$, $CoCl_3$, $ZnSO_4$ $Fe_2(SO_4)_3$, $Al_2(SO_4)_3$, $Al(OH)_3$, $SOCl_2$, $PCl_5$, $SiO_2$, $Al_2O_3$, $Cl_2$, $SO_2Cl$, $SO_2$, $S_2O_3HF$, $BF_3$, $H_2CrO_4$, $H_2S$, $HNO_2$, $HNO_3$, $H_3PO_3$, $H_4SiO_4$, $H_2SnO_3$, $H_2TeO_4$, $H_2S_2O_3$), organic acidic substances (e.g. formic acid, acetic acid, chloroacetic acid, chlorobenzoic acid, toluenesulfonic acid, chloropropionic acid, oxalic acid, cyanuric acid, hydroquinone, maleic acid, phenol, phthalic acid, propionic acid, succinic acid), cation exchange resins, etc. These substances may be used alone or in combination.

Examples of the solvent which may be used for the reaction medium include water, alcohols (e.g. methanol, ethanol, n-propanol, isopropanol, n-butanol, sec-butanol, t-butanol, amyl alcohol, hexanol, octanol, decanol, ethylene glycol, propylene glycol, triethylene glycol, 1,3-butylene glycol, dipropylene glycol, diethylene glycol), ethers (e.g. furan, petroleum ether, tetrahydrofuran, isopropyl ether, dioxane acetal, methylal, glycolmethylene ether, butyl methyl ether, ethyl ether), ketones (e.g. acetone, methyl ethyl ketone, methyl isobutyl ketone, ethyl butyl ketone), hydrocarbons (e.g. pentane, hexane, benzene, cyclohexane, heptane, methylcyclohexane, toluene, octane, ethylbenzene, cumene, decane, xylene), esters (e.g. methyl formate, methyl acetate, ethyl acetate, isopropyl acetate, n-propyl acetate, butyl acetate, amyl acetate, cyclohexyl acetate) and others (e.g. methylene chloride, sulfur dioxide, chloroform, 1,1,1-trichloroethane, carbon tetrachloride, acetonitrile, dichloroethane, trichloroethane, 1,2-dichloropropane, ethyl chloride, vinylidene chloride, 1,2-dichloroethylene 1,1,1,2-tetrachloroethane, 1,1,2,2 - tetrachloroethane, pentachloroethane, hexachloroethane, tetrachloroethylene, 1,1,2-trichloroethane, acetic acid, formic acid, morpholine, mesityl oxide, chlorobenzene, ethylene glycol monomethyl ether, ethylene glycol monoisopropyl ether, dimethylformamide, anisole, methoxybutanol, furfural, pentachloroethane, diacetoxyalcohol, methoxybutanol, diethylformamide, phenol, diethylene glycol dibutyl ether, diethylene glycol diethylene ether, dimethylsulfoxide, ethylene glycol diacetate, N-methylpyrrolidone, ethylene glycol dibutyl ether, benzyl alcohol, nitrobenzene, sulforane, glycerol). These solvents may be used alone or in combination.

Among the above solvents, t-butanol forms an anquilibrium with isobutene. When t-butanol or isobutene is employed in excess, a part of the same is converted into the other. Thus, t-butanol exists always in the reaction system and its express addition is not always required. The addition of such a solvent as 1,4-dioxane or toluene is effective in increasing the yield of the objective isoprene. Further, the simultaneous use of such a surfactant as polyethylene glycol octyl phenyl ether, or choline chloride is favorable in affording a better result.

The reaction temperature in the process of the present invention is from 110° to 180° C. When the reaction temperature is lower than 110° C., the reaction rate becomes too slow, a long time is required for completion of the reaction and various side reactions take place. Thus, the objective isoprene can not be produced in high yields. When the reaction temperature is higher than 180° C., the reaction pressure is much increased and the side reaction of the produced isoprene is accelerated resulting in the decrease of the yield of isoprene.

However, as the reaction of the present invention is able to proceed at a temperature lower than 110° C., it may be accomplished in two steps: i.e. the first step is effected at a temperature lower than 110° C. and the second step is effected at a temperature from 110° to 180° C. Further, the reaction may be divided into two steps, i.e. a lower temperature reaction and a higher temperature reaction, within the range of temperature from 110° to 180° C.

The reaction pressure is not required to be controlled. Thus, the reaction may be effected under an autogenic pressure.

The starting isobutene is not necessarily required to be highly pure. It may be such an impure one as the so-called "B—B fraction" (the $C_4$ fraction obtained by distilling naphta cracking gas and mainly consisting of butane, butene and butadiene) or the so-called "spent B—B fraction" (the $C_4$ fraction obtained by excluding butadiene from the B—B fraction). Sometimes, it may be diluted with a suitable diluent such as nitrogen, carbon dioxide, carbon monoxide, lower hydrocarbon (e.g. methane, ethane), nitrogen monoxide or sulfur dioxide.

The starting DMD is also not necessarily required to be highly pure. It may be such a crude one as obtained in the so-called "IFP method."

The introduction of DMD into the reaction system may be effected separately from or simultaneously with that of the solvent.

The proportion of isobutene to DMD is normally required to be more than 1 in molar ratio. If t-butanol is used as the solvent, such proportion may be 1 or less in molar ratio, because a part of the t-butanol is converted into isobutene. In other words, the proportion of isobutene to DMD can be zero when the molar ratio of t-butanol to DMD is more than 1.

Practical and presently preferred embodiments of this invention are illustratively shown in the following examples wherein parts and percent are by weight unless otherwise indicated.

EXAMPLE 1

In a glass lining autoclave equipped with an agitator, there are charged 30 parts of water, 20 parts of t-butanol, 10 parts of 4,4-dimethyl-1,3-dioxane (purity, 97%) and 30 parts of 1,4-dioxane, and a sealed glass tube accommodating 5 parts of aluminum chloride is placed therein. After addition of 35 parts of isobutene (purity, 99%), the autoclave is heated in an oil bath. When the inner temperature of the autoclave reaches to 160° C., stirring is started whereby the sealed tube is broken. After 20 minutes, the autoclave is cooled to room temperature and the gas in the autoclave is released to make an atmospheric pressure. The released gas is collected in a trap cooled with Dry Ice-acetone. When the inner pressure of the autoclave reaches to an atmospheric pressure, the remaining liquid is diluted with n-butanol, combined with the liquid collected at the trap and subjected to gas chromatography whereby the yield of isoprene based on 4,4-dimethyl-1,3-dioxane is confirmed to be 162 mol percent. Only a slight amount of 4,4-dimethyl-1,3-dioxane is remained in unreacted.

EXAMPLE 2

As in Example 1, the reaction is carried out but using 30 parts of benzene in place of 30 parts of 1,4-dioxane. The reaction mixture is subjected to gas chromatography whereby the yield of isoprene based on 4,4-dimethyl-1,3-dioxane is confirmed to be 156 mol percent. Only a slight amount of 4,4-dimethyl-1,3-dioxane is remained in unreacted.

EXAMPLE 3

As in Example 1, the reaction is carried out but using 5 parts of 4,4-dimethyl-1,3-dioxane in place of 10 parts of 4,4-dimethyl-1,3-dioxane. The reaction mixture is subjected to gas chromatography whereby the yield of isoprene based on 4,4-dimethyl-1,3-dioxane is confimed to be 166 mol pecent. Only a slight amount of 4,4-dimethyl-1,3-dioxane is remained in unreacted.

EXAMPLE 4

As in Example 1, the reaction is carried out but using no 1,4-dioxane. The reaction mixture is subjected to gas chromatography whereby the yield of isoprene based on 4,4-dimethyl-1,3-dioxane is confirmed to be 130 mol percent.

EXAMPLE 5

As in Example 1, the reaction is carried out but using 15 parts of formic acid in place of 5 parts by weight of aluminum chloride and using no 1,4-dioxane. The reaction mixture is subjected to gas chromatography whereby the yield of isoprene based on 4,4-dimethyl-1,3-dioxane is confirmed to be 112 mol percent.

EXAMPLES 6 AND 7

As in Example 1, the reaction is carried out but varying the reaction temperature and the catalyst. The results are shown in the following table wherein the results of some reference examples are also shown.

TABLE 3

| | Reaction | | | Yield of isoprene based on 4,4-dimethyl-1,3-dioxane (mol percent) |
|---|---|---|---|---|
| | Temperature (° C.) | Time (minutes) | Catalyst | |
| Example No.: | | | | |
| 6 | 180 | 20 | $AlCl_3 \cdot 6H_2O$ (5 parts) | 110. |
| 7 | 110 | 180 | Ion exchange resin Amberlite IR-120 (3 parts) | 40. |
| Reference Example No: | | | | |
| 1 | 200 | 15 | $AlCl_3 \cdot 6H_2O$ (5 parts) | Slight (dark brown). |
| 2 | 100 | 240 | Ion exchange resin Amberlite IR-120 (3 parts) | Trace. |
| 3 | 100 | 240 | $AlCl_3 \cdot 6H_2O$ (5 parts) | Do. |

What is claimed is:

1. A method for producing isoprene which comprises reacting isobutene and 4,4-dimethyl-1,3-dioxane in an aqueous solvent system in a liquid phase at a temperature from 110 to 180° C. in contact with a catalyst which is an acidic substance under the conditions of said reaction, the molar ratio of isobutene to 4,4-dimethyl-1,3-dioxane being more than 1.

2. The method according to claim 1, wherein the solvent system includes at least one solvent other than water.

3. A method for producing isoprene which comprises reacting isobutene and 4,4-dimethyl-1,3-dioxane in a reaction medium of water or its mixture with 5-butanol in a liquid phase in contact with a catalyst which is an acidic substance under said reaction conditions at a temperature from 110° C. to 180° C., the molar ratio of the isobutene to 4,4-dimethyl-1,3-dioxane being more than 1.

4. The method according to claim 3, wherein the inorganic acidic substance includes HCl, HBr, $H_2SO_4$, $H_2SO_3$, $H_3PO_4$, $H_3BO_3$, $HBO_2$, $ClSO_3H$, phosphorotungstic acid, borotungstic acid, $AlCl_3$, $FeCl_2$, $FeCl_3$, $HgCl_2$, $ZnCl_2$, $PdCl_2$, $CrPO_4$, $Cr_2(SO_4)_3$, $MnCl_2$, $CdCl_4$, $LiCl$, $FeSO_4$, $CrCl_3$, $NiCl_3$, $CoCl_2$, $CuCl_2$, $CoCl_3$, $ZnSO_4$, $Fe_2(SO_4)_3$, $Al_2(SO_4)_3$, $Al(OH)_3$, $SOCl_2$, $PCl_5$, $SiO_2$, $Al_2O_3$, $Cl_2$, $SO_2Cl_2$, $SO_2$, $S_2O_3$, HF, $BF_3$, $H_2CrO_4$, $H_2S$, $HNO_2$, $HNO_3$, $H_3PO_3$, $H_4SiO_4$, $H_2SnO_3$, $H_2TeO_4$, and $H_2S_2O_3$.

5. The method according to claim 3, wherein the organic acid substance includes formic acid, acetic acid, chloroacetic acid, chlorobenzoic acid, toluenesulfonic acid, chloropropionic acid, oxalic acid, cyanuric acid, hydroquinone, maleic acid, phenol, phthalic acid, propionic acid, and succinic acid.

6. The method according to claim 3, wherein 1,4-dioxane, benzene or toluene is added to the reaction medium.

References Cited

UNITED STATES PATENTS 3,284,533  11/1966  Mitsutani _____ 260—681

FOREIGN PATENTS 238,089  1/1959  Australia _____ 260—681

DELBERT E. GANTZ, Primary Examiner

V. O'KEEFE, Assistant Examiner